US009792640B2

(12) United States Patent
Meshulam et al.

(10) Patent No.: US 9,792,640 B2
(45) Date of Patent: Oct. 17, 2017

(54) GENERATING AND PROVIDING CONTENT RECOMMENDATIONS TO A GROUP OF USERS

(71) Applicant: JINNI MEDIA LTD., Rosh Ha'ayin (IL)

(72) Inventors: Ram Meshulam, Yavne (IL); Mordechai Mori Rimon, Jerusalem (IL); Izhak Ben Zaken, Shimshit (IL)

(73) Assignee: JINNI MEDIA LTD., Rosh Ha'ayin (IL)

( * ) Notice: Subject to any disclaimer, the term of this patent is extended or adjusted under 35 U.S.C. 154(b) by 663 days.

(21) Appl. No.: 13/872,117

(22) Filed: Apr. 28, 2013

(65) Prior Publication Data

US 2013/0238710 A1    Sep. 12, 2013

Related U.S. Application Data

(63) Continuation-in-part of application No. 12/859,248, filed on Aug. 18, 2010.

(51) Int. Cl.
*G06Q 30/00* (2012.01)
*G06Q 30/06* (2012.01)
*H04L 29/08* (2006.01)

(52) U.S. Cl.
CPC ..... *G06Q 30/0631* (2013.01); *G06Q 30/0605* (2013.01); *H04L 67/22* (2013.01); *H04L 67/306* (2013.01)

(58) Field of Classification Search
CPC ................ G06Q 30/06–30/0645; G06Q 50/01
See application file for complete search history.

(56) References Cited

U.S. PATENT DOCUMENTS 5,237,502 A    8/1993   White et al.
5,832,435 A    11/1998  Silverman
(Continued)

FOREIGN PATENT DOCUMENTS

WO    2012110690    8/2012
WO    2013013091    1/2013

OTHER PUBLICATIONS

International Application PCT/IB2014/063889 International Search Report and Written Opinion of the International Searching Authority, dated Feb. 24, 2015 (7 pages).
(Continued)

*Primary Examiner* — Adam Levine
(74) *Attorney, Agent, or Firm* — Vladimir Sherman; Professional Patent Solutions

(57) ABSTRACT

Disclosed are systems, apparatuses, circuits, methods and computer executable code sets for generating and providing content recommendations to match the tastes and preferences of a group of users. a Recommendation Engine is used for generating two or more individual content recommendation sets for each of the members in the user group. A Recommendation Aggregation Module is used for adding and combining the individual content recommendation sets into an aggregated recommendation set. a Recommendation Selection Module is used for selecting at least a subset of the content items in the aggregated recommendation set for inclusion in a content recommendation result set. A Profile Engine is used for building individual group users profiles from which a merged group profile is constructed, or for building a single joint group profile based on inputs from multiple group users.

18 Claims, 11 Drawing Sheets

(56) References Cited

U.S. PATENT DOCUMENTS

| | | | |
|---|---|---|---|
| 6,266,649 B1 | 7/2001 | Linden et al. | |
| 7,254,552 B2 * | 8/2007 | Bezos | G06Q 30/00 705/26.44 |
| 7,630,986 B1 * | 12/2009 | Herz | G06Q 10/10 |
| 7,660,815 B1 | 2/2010 | Scofield et al. | |
| 7,668,910 B2 | 2/2010 | Dinges et al. | |
| 7,756,753 B1 * | 7/2010 | McFarland | G06Q 30/02 705/26.1 |
| 7,921,069 B2 | 4/2011 | Canny et al. | |
| 8,255,458 B2 | 8/2012 | Cohen et al. | |
| 9,123,071 B1 * | 9/2015 | McFarland | G06Q 30/02 |
| 2002/0052873 A1 | 5/2002 | Delgado et al. | |
| 2002/0116291 A1 * | 8/2002 | Grasso | G06F 17/30011 707/736 |
| 2004/0034652 A1 | 2/2004 | Hofmann et al. | |
| 2004/0078190 A1 | 4/2004 | Fass et al. | |
| 2005/0065773 A1 | 3/2005 | Huang et al. | |
| 2006/0149558 A1 | 7/2006 | Kahn et al. | |
| 2006/0288015 A1 | 12/2006 | Schirripa et al. | |
| 2007/0250901 A1 | 10/2007 | McIntire et al. | |
| 2008/0086311 A1 | 4/2008 | Conwell et al. | |
| 2008/0133228 A1 | 6/2008 | Rao | |
| 2008/0167875 A1 | 7/2008 | Bakis et al. | |
| 2008/0249764 A1 * | 10/2008 | Huang | G06F 17/2785 704/9 |
| 2008/0294607 A1 | 11/2008 | Partovi et al. | |
| 2009/0228264 A1 | 9/2009 | Williams et al. | |
| 2010/0138271 A1 | 6/2010 | Henkin et al. | |
| 2011/0093271 A1 | 4/2011 | Bernard | |
| 2011/0320191 A1 | 12/2011 | Makeyev | |
| 2012/0036137 A1 | 2/2012 | Naidu et al. | |
| 2012/0109739 A1 | 5/2012 | Gupta | |
| 2013/0085866 A1 | 4/2013 | Levitis et al. | |
| 2013/0238419 A1 | 9/2013 | Glick et al. | |
| 2013/0238710 A1 | 9/2013 | Meshulam et al. | |
| 2014/0172501 A1 | 6/2014 | Meshulam et al. | |
| 2014/0236572 A1 | 8/2014 | Meshulam et al. | |

OTHER PUBLICATIONS

Yu et al. "TV program recommendation for multiple viewers based on user profile merging." In: User Modeling and User-Adapted Interaction 16.1. Jun. 10, 2006.

Adomavicius et al. "Toward the next generation of recommender systems: A survey of the state-of-the-art and possible extensions." In: IEEE Transaction on Knowledge and Data Engineering 17.6. Jun. 2005 (Jun. 2005).

Jameson et al. "Recommendation to groups." In: The adaptive web. 2007 (2007).

Hung, Chia-Chuan, et al. "Tag-based user profiling for social media recommendation." (Workshop on Intelligent Techniques for Web Personalization & Recommender Systems at AAAI2008. vol. 45. 2008).

International Application PCT/IB2014/059066 International Search Report and Written Opinion of the International Searching Authority dated Aug. 4, 2014 (12 pages).

International Application PCT/IB2014/060526 International Search Report and Written Opinion of the International Serarching Authority dated Sep. 15, 2014 (7 pages).

International Application PCT/IB2014/060521 International Search Report and Written Opinion of the International Searching Authority dated Sep. 15, 2014 (10 pages).

* cited by examiner

↓

A recommendation request for a group of 2 users is received:
- <u>User A</u> taste profile includes 2 tastes:
A1: Twists and Turns, Mind Bending, Uncover Truth;
A2: Special Effects, Stylized, Master Villain;
User A is the group recommendation request initiator
- <u>User B</u> taste profile includes 1 taste:
B1: Non-linear, Mind bending;
User B has already watched the movie 'Iron Man'. (1500)

↓

For each user, based on his inputs, the recommendation engine selects an individual set of recommendations, from a content DB:
User A recommendations: Mind-hunters (2004), Below (2002), Dial M for Murder (1954), Iron Man (2008), Batman Returns (1992);
User B recommendations: Mind-hunters (2004), The Others (2001), The-Adjustment-Bureau (2011). (1600)

↓

The recommendation aggregation module builds an aggregated recommendations set based on the 'individual user recommendations sets' aggregated set includes:
Mind Hunters (2004): User A: high confidence, User B: high confidence
Iron Man (2008): User A: high confidence, User B: already watched
Batman Returns (1992): User A: high confidence, User B: unknown. (1700)

↓

The recommendation selection module selects a subset of items as a result set:
Mind-Hunters (2004), Batman Returns (1992). (1800)

↓

Fig. 1C

GENERATING AND PROVIDING CONTENT RECOMMENDATIONS TO A GROUP OF USERS

FIELD OF THE INVENTION

The present invention generally relates to the fields of content matching and recommendation. More specifically, the present invention relates to a system, apparatus, circuit, method and associated computer executable code for generating and providing content recommendations to a group of users.

RELATED APPLICATIONS

This application is a continuation-in-part of U.S. patent application Ser. No. 12/859,248, filed with the USPTO on Aug. 18, 2010, which is hereby incorporated by reference in its entirety. The specification and figures of U.S. patent application Ser. No. 12/859,248 are also included herein as an appendix of the present application and forms an integral part of the present application.

BACKGROUND

In the field of content matching and recommendation, Recommender systems are active information filtering systems that attempt to present to the user information items (film, television, music, books, news, web pages) the user is interested in. These systems add or remove information items to the information flowing towards the user. Recommender systems typically use collaborative filtering approaches or a combination of the collaborative filtering and content-based filtering approaches.

Taking the above into account, there clearly remains a need, in the fields of content matching and recommendation, for systems apparatuses circuits methods and associated computer executable code sets that introduce unique approaches to content recommendation, adapted to match the tastes and preferences of not a single user but rather a group of users, based on their various preferences and taste profiles.

SUMMARY OF THE INVENTION

Below are described a number of novel, innovative systems, apparatuses, circuits, methods and associated computer executable code sets for generating and providing content recommendations to a group of users. According to some embodiments of the present invention, there may be provided a computerized recommendation system for generating and providing content recommendations to match the tastes and preferences of a group of users, wherein the system includes: (1) a Recommendation Engine for generating one or more individual content recommendation sets for each of the members in the user group; (2) a Recommendation Aggregation Module for adding and combining the individual content recommendation sets into an aggregated recommendation set; and (3) a Recommendation Selection Module for selecting at least a subset of the content items in the aggregated recommendation set for inclusion in a content recommendation result set and providing it to the pertinent group of users.

According to some embodiments of the present invention, the Recommendation Engine may generate the individual content recommendation sets based on: (1) content items in one or more functionally associated Content Storage databases; and (2) users inputs relating to: tastes, preferences, habits and/or feedback on previously consumed content items, in one or more functionally associated Users' Inputs Storage databases. According to some embodiments, the Recommendation Selection Module, when selecting content items, may reference one or more functionally associated Users' Weights Storage databases. Content items initially recommended to users having a higher weight (e.g. group initiators) may receive higher preference for inclusion in the content recommendation result set, whereas content items initially recommended to users having a lower weight (e.g. parents in parent-kids groups) may receive lower preference for inclusion in the content recommendation result set.

According to some embodiments of the present invention, the Recommendation Selection Module, as part of selecting at least a subset of the content items in the aggregated recommendation set, may utilize one or more of the following components: (1) a Per Item User Counter for recording and counting the number of users to which a given content item was recommended; (2) an Item-User Relevancy Level Calculator for estimating how relevant is a given content item to at least some of the members in the user group; (3) a Previous Items Similarity Calculator for referencing a Previous Recommendations Log database and estimating the similarity level of a given content item to content items selected for the same, and/or a partially overlapping, group(s) in previous rounds of selection; (4) a Direct User Input Analyzer for processing and considering explicit and/or implicit inputs, of at least some of the members in the user group, relating to a given content item; and (5) a Community Ratings Analyzer for referencing a proprietary and/or third party Community Ratings Storage database and giving a higher preference for inclusion in the content recommendation result set to content items having higher popularity in the community.

According to some embodiments of the present invention, the Recommendation Engine may be functionally associated with a Content Catalogs Prioritization Module for primarily, or only, offering content items from specific preferred catalogues such as, but not limited to: catalogues previously used for supplying content item recommendations for the same group initiator or group members, catalogues of third parties offering higher profit margins to recommending entities, catalogues more popular among other recommendation services. According to some embodiments of the present invention, the Recommendation Engine may comprise, and utilize as part of generating two or more individual content recommendation sets for each of the members in the user group, any content recommendation, content matching, or content analysis engine known today or to be devised in the future, such as, but not limited to: statistical recommendation engine(s) (e.g. a collaborative filtering engine) and/or semantic recommendation engine(s) (e.g. an incremental taste engine).

According to some embodiments of the present invention, the Recommendation Selection Module may provide, along with the selected content recommendation result set, a per-user content match/confidence rates feedback, for content items in the result set. Members of the pertinent group of users may be accordingly presented, for example over a Group Recommendation Content Output Device, with data indicative of the direct match rate between content items recommended to their entire group and their own individual profile/characteristics, and the confidence of the system in that assessment.

According to some embodiments of the present invention, there may be provided a computerized recommendation system for generating and providing content recommendations to match the tastes and preferences of a group of users, wherein the system includes: (1) a Profile Engine for generating two or more individual user profiles for each of the members in the user group; (2) a Profile Aggregation Module for adding and combining the individual user profiles into a merged group profile; and (3) a Recommendation Engine for generating a content recommendation set for the user group, at least partially based on the merged group profile.

According to some embodiments, the Profile Aggregation Module, when adding and combining the individual user profiles into a merged group profile, may reference one or more functionally associated Users' Weights Storage databases. User profiles belonging to users having a higher weight (e.g. group initiators) may receive higher effect and thus be more dominant in the Merged Group Profile for which the content recommendation result set is generated, whereas user profiles belonging to users having a lower weight (e.g. parents in parent-kids groups) may receive lower effect and thus be less dominant in the Merged Group Profile for which the content recommendation result set is generated.

According to some embodiments of the present invention, there may be provided a computerized recommendation system for generating and providing content recommendations to match the tastes and preferences of a group of users, wherein the system includes: (1) a Profile Engine for generating a single joint users' taste profile which is generated based on user inputs from two or more members of the user group (i.e. inputs from multiple users are treated as inputs from a single virtual user and the generated profile is designed to match the virtual user's inputs-based taste/preferences); (2) a Recommendation Engine for generating a joint profile content recommendation set for the user group, at least partially based on the joint users' taste profile; and (3) a Recommendation Selection Module for selecting at least a subset of the content items in the joint profile content recommendation set for inclusion in a content recommendation result set and providing it to the pertinent group of users.

According to some embodiments, the Profile Engine, when generating a single joint users' taste profile which is generated based on user inputs from two or more members of the user group, may reference one or more functionally associated Users' Weights Storage databases. User inputs belonging to users having a higher weight (e.g. group initiators) may receive higher effect and thus have more influence on the resulting joint users' taste profile, whereas user inputs belonging to users having a lower weight (e.g. parents in parent-kids groups) may receive lower effect and thus have less influence on the resulting joint users' taste profile.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings:

In FIG. 1C there is shown, in accordance with some embodiments of the present invention, a flowchart of the main steps and decisions executed by a simplified exemplary system for generating and providing content recommendations to match the tastes and preferences of a group of users;

DETAILED DESCRIPTION

Figure 1A:
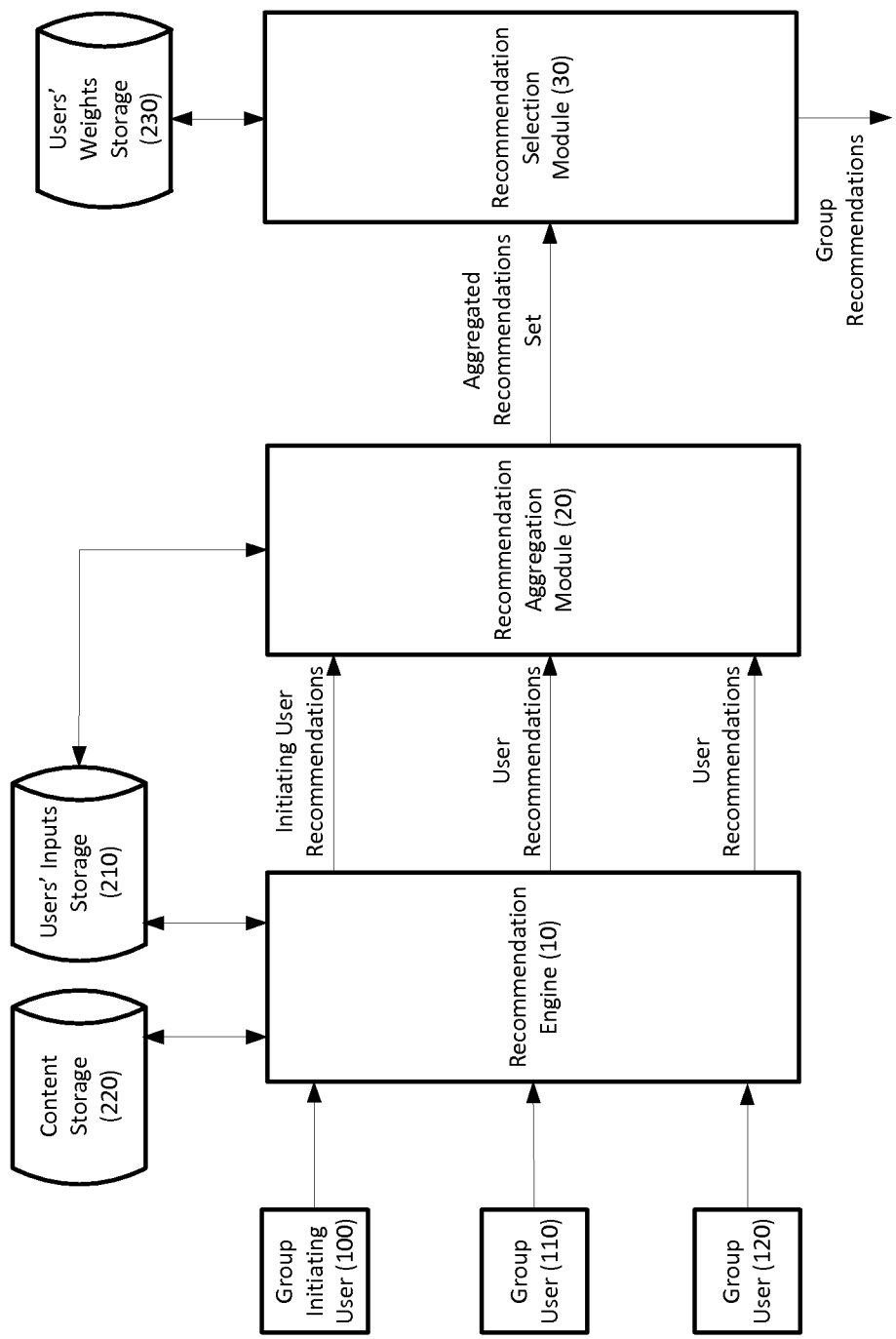
In FIG. 1A there is shown, in accordance with some embodiments of the present invention, an exemplary system for generating and providing content recommendations to match the tastes and preferences of a group of users.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention includes systems, apparatuses, circuits, methods and associated computer executable code for generating and providing content recommendations to a group of users.

According to some embodiments of the present invention, there may be provided a computerized recommendation system for generating and providing content recommendations to match the tastes and preferences of a group of users, wherein the system includes: (1) a Recommendation Engine for generating two or more individual content recommendation sets for each of the members in the user group; (2) a Recommendation Aggregation Module for adding and combining the individual content recommendation sets into an aggregated recommendation set; and (3) a Recommendation Selection Module for selecting at least a subset of the content items in the aggregated recommendation set for inclusion in a content recommendation result set and providing it to the pertinent group of users.

In FIG. 1A there is shown, in accordance with some embodiments of the present invention, an exemplary system for generating and providing content recommendations to match the tastes and preferences of a group of users, comprising: a Recommendation Engine (10) for generating two or more individual content recommendation sets for each of the members in the user group; a Recommendation Aggregation Module (20) for adding and combining the individual content recommendation sets into an aggregated recommendation set; and a Recommendation Selection Module (30) for selecting at least a subset of the content items in the aggregated recommendation set for inclusion in a content recommendation result set and providing it to the pertinent group of users.

The Recommendation Engine (10) receives a recommendation request initiated by a Group Initiating User (100). Based on user inputs, from a Users' Inputs Storage (210), of the Group Initiating User (100) and other Group Users (110, 120); the Recommendation Engine (10) selects an individual set of recommendations, from a Content Storage (220), for each of the group members. The Recommendation Aggregation Module (20) adds and combines the individual content recommendation sets into an aggregated recommendation set that may include some or all of the recommendations in the individual sets. The Recommendation Selection Module (30) selects at least a subset of the content items in the aggregated recommendation set for inclusion in a content recommendation result set and provides it to the pertinent group of users. According to some embodiments, the Recommendation Selection Module (30) considers users' weights, from a Users' Weights Storage (230), prioritizing items which are available to, and/or were recommended to, users having a greater weight.

Figure 1B:
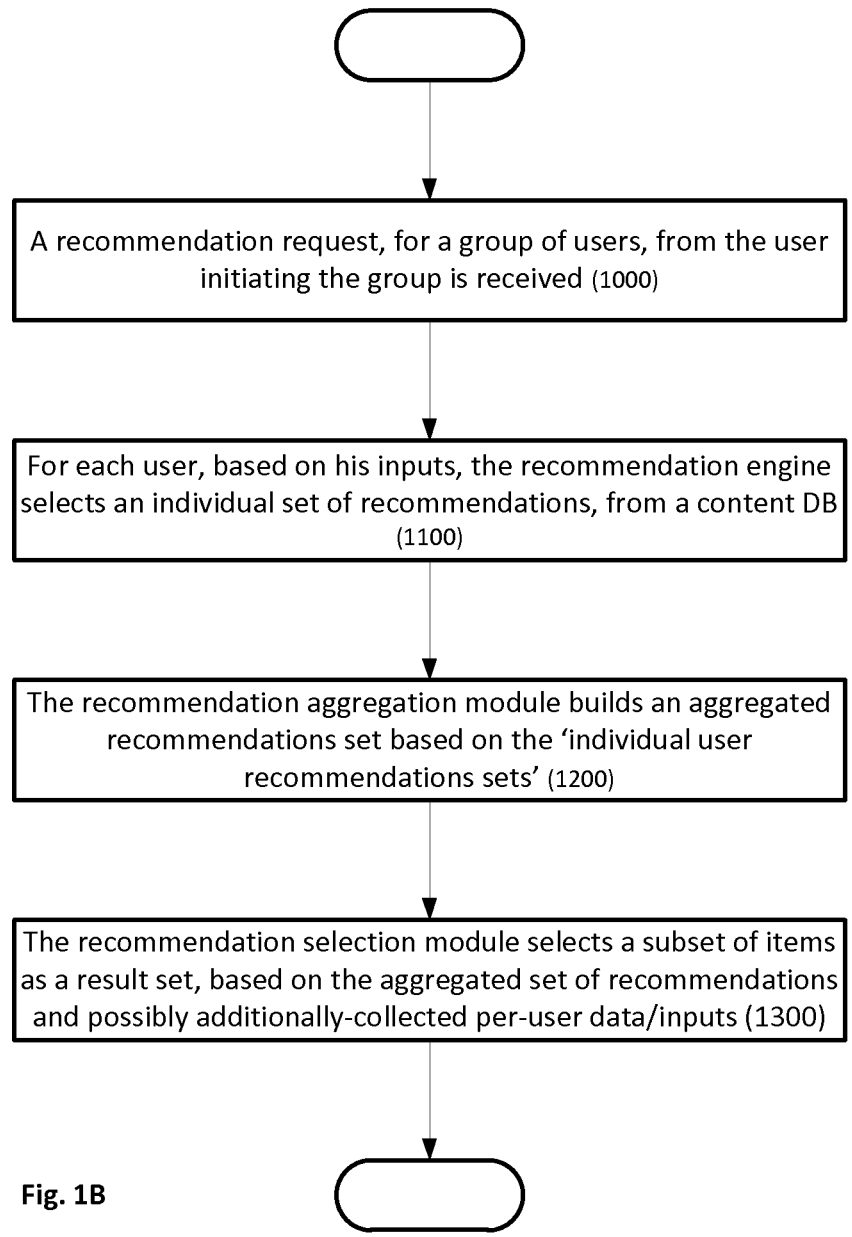
In FIG. 1B there is shown, in accordance with some embodiments of the present invention, a flowchart of the main steps executed by an exemplary computerized system for generating and providing content recommendations to match the tastes and preferences of a group of users.

In FIG. 1B there is shown, in accordance with some embodiments of the present invention, a flowchart of the main steps executed by an exemplary computerized system for generating and providing content recommendations to match the tastes and preferences of a group of users. The method exemplified comprises the following steps: Receiving a recommendation request, for a group of users, from the user initiating the group (1000); Selecting an individual set of recommendations for each group user based on his available (e.g. stored, accessed, received) inputs (1100); Building an aggregated recommendations set based on recommendations from the user-individual recommendation sets (1200); and Selecting from the aggregated recommendations set a subset of item recommendations as a result set, possibly considering collected per-user data and/or weights allocated to users (1300).

In FIG. 1C there is shown, in accordance with some embodiments of the present invention, a flowchart of the main steps and decisions executed by a simplified exemplary system for generating and providing content recommendations to match the tastes and preferences of a group of users. In this example, a recommendation request for a group of 2 users is received (1500). User A taste profile includes 2 tastes: A1: Twists and Turns, Mind Bending, Uncover Truth; A2: Special Effects, Stylized, Master Villain; User A is the group recommendation request initiator. User B taste profile includes 1 taste: B1: non-linear, mind bending; User B has already watched the movie 'Iron Man'.

For each user, based on his inputs, the Recommendation Engine selects an individual set of recommendations, from a content database (1600). User A recommendations include: Mind-hunters (2004), Below (2002), Dial M for Murder (1954), Iron Man (2008), Batman Returns (1992); User B recommendations include: Mind-hunters (2004), The Others (2001), The-Adjustment-Bureau (2011). The Recommendation Aggregation Module builds an aggregated recommendations set based on the 'individual user recommendations sets' (1700), the aggregated set includes: Mind Hunters (2004): User A: high confidence, user B: high confidence; Iron Man (2008): User A: high confidence, User B: already watched; Batman Returns (1992): User A: high confidence, User B: unknown. The Recommendation Selection Module then selects a subset of items as a result set (1800): Mind-Hunters (2004), Batman Returns (1992).

According to some embodiments of the present invention, the Recommendation Engine may generate the individual content recommendation sets based on: (1) content items in one or more functionally associated Content Storage databases; and (2) users inputs relating to: tastes, preferences, habits and/or feedback on previously consumed content items, in one or more functionally associated Users' Inputs Storage databases. According to some embodiments, the Recommendation Selection Module, when selecting content items, may reference one or more functionally associated Users' Weights Storage databases. Content items initially recommended to users having a higher weight (e.g. group initiators) may receive higher preference for inclusion in the content recommendation result set, whereas content items initially recommended to users having a lower weight (e.g. parents in parent-kids groups) may receive lower preference for inclusion in the content recommendation result set.

According to some embodiments of the present invention, the Recommendation Selection Module, as part of selecting at least a subset of the content items in the aggregated recommendation set, may utilize one or more of the following components: (1) a Per Item User Counter for recording and counting the number of users to which a given content item was recommended; (2) an Item-User Relevancy Level Calculator for estimating how relevant is a given content item to at least some of the members in the user group; (3) a Previous Items Similarity Calculator for referencing a Previous Recommendations Log database and estimating the similarity level of a given content item to content items selected for the same, and/or a partially overlapping, group(s) in previous rounds of selection; (4) a Direct User Input Analyzer for processing and considering explicit and/or implicit inputs, of at least some of the members in the user group, relating to a given content item; and (5) a Community Ratings Analyzer for referencing a proprietary and/or third party Community Ratings Storage database and giving a higher preference for inclusion in the content recommendation result set to content items having higher popularity in the community.

Figure 1D:
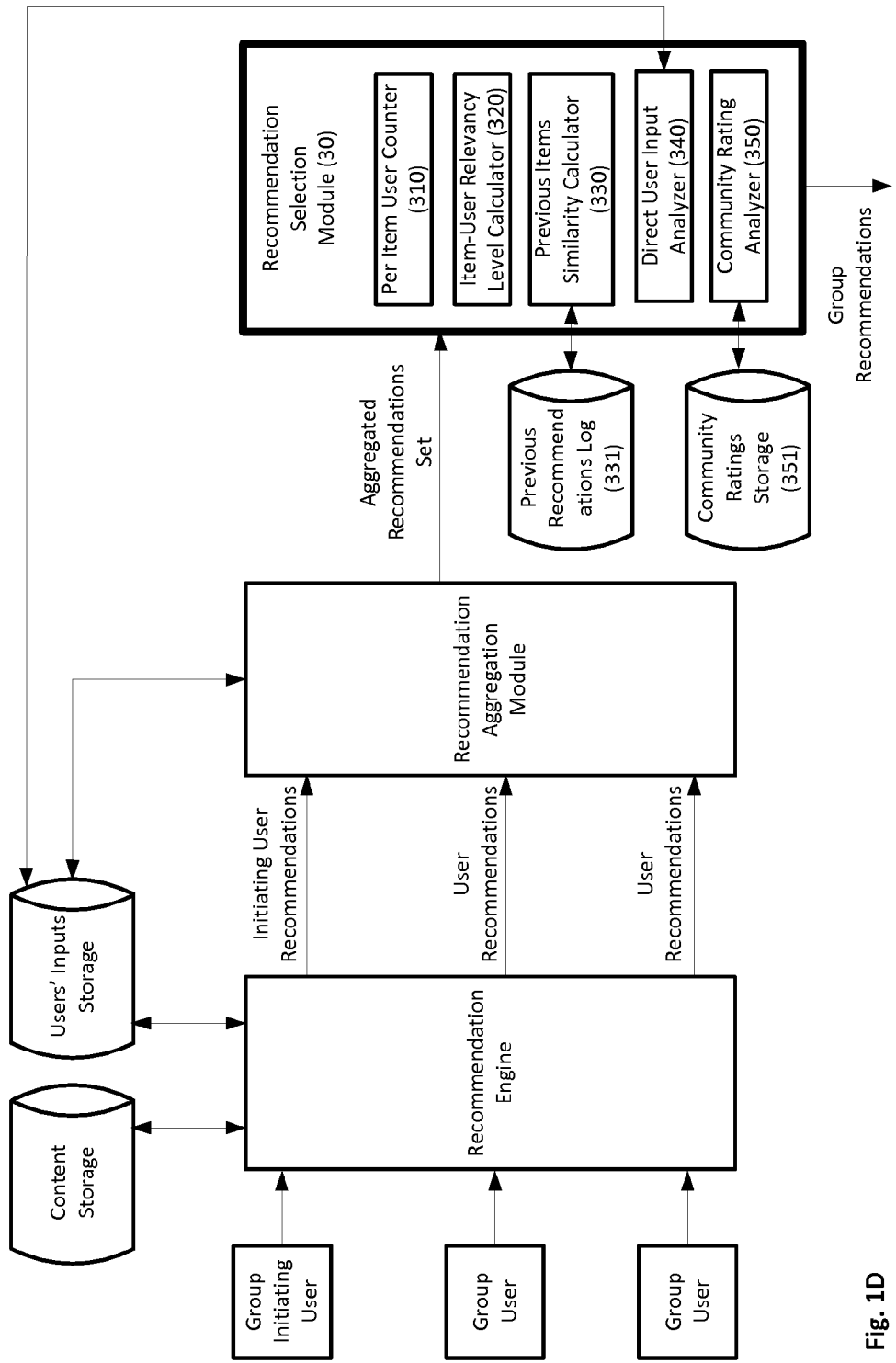
In FIG. 1D there is shown in further detail, a Recommendation Selection Module of an exemplary system for generating and providing content recommendations to match the tastes and preferences of a group of users, in accordance with some embodiments of the present invention.

In FIG. 1D there is shown in further detail, a Recommendation Selection Module (30) of an exemplary system for generating and providing content recommendations to match the tastes and preferences of a group of users, in accordance with some embodiments of the present invention, comprising: a Per Item User Counter (310) for recording and counting the number of users to which a given content item was recommended; an Item-User Relevancy Level Calculator (320) for estimating how relevant is a given content item to at least some of the members in the user group; a Previous Items Similarity Calculator (330) for referencing a Previous Recommendations Log (331) database and estimating the similarity level of a given content item to content items selected for the same, and/or a partially overlapping, group(s) in previous rounds of selection; a Direct User Input Analyzer (340) for processing and considering explicit and/or implicit inputs, of at least some of the members in the user group, relating to a given content item; and a Community Ratings Analyzer (350) for referencing a proprietary and/or third party Community Ratings Storage (351) database and giving a higher preference for inclusion in the content recommendation result set to content items having higher popularity in the community.

According to some embodiments of the present invention, the Recommendation Engine may be functionally associated with a Content Catalogs Prioritization Module for primarily, or only, offering content items from specific preferred catalogues such as, but not limited to: catalogues previously used for supplying content item recommendations for the same group initiator or group members, catalogues of third parties offering higher profit margins to recommending entities, catalogues more popular among other recommendation services. According to some embodiments of the present invention, the Recommendation Engine may comprise, and utilize as part of generating two or more individual content recommendation sets for each of the members in the user group, any content recommendation, content matching, or content analysis engine known today or to be devised in the future, such as, but not limited to: statistical recommendation engine(s) (e.g. a collaborative filtering engine) and/or semantic recommendation engine(s) (e.g. an incremental taste engine).

According to some embodiments of the present invention, the Recommendation Selection Module may provide, along with the selected content recommendation result set, a per-user content match/confidence rates feedback, for content items in the result set. Members of the pertinent group of users may be accordingly presented, for example over a Group Recommendation Content Output Device, with data indicative of the direct match rate between content items recommended to their entire group and their own individual profile/characteristics, and the confidence of the system in that assessment.

Figure 1E:
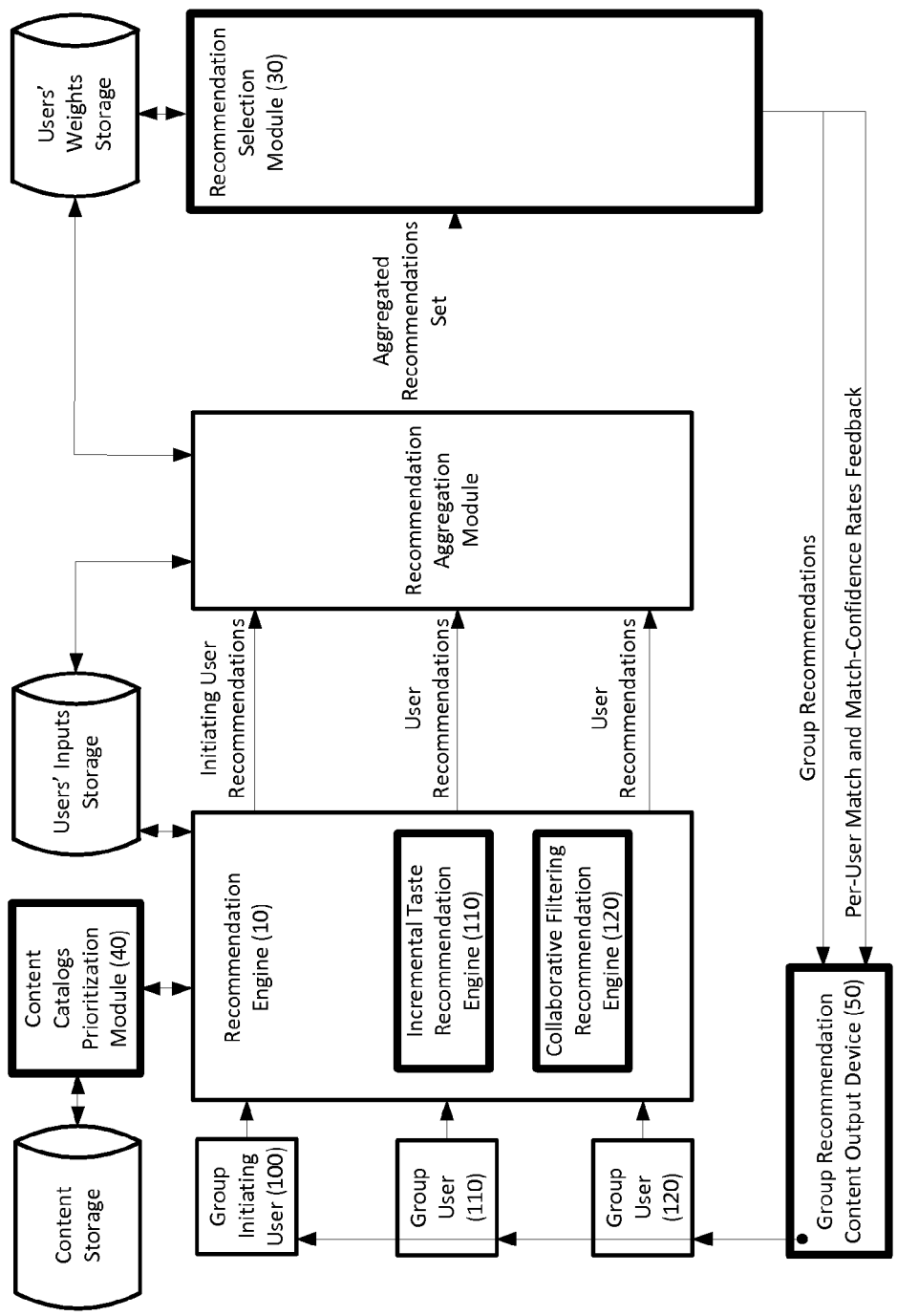
In FIG. 1E there is shown, in accordance with some embodiments of the present invention, an exemplary system for generating and providing content recommendations to match the tastes and preferences of a group of users, wherein the Recommendation Engine is functionally associated with a Content Catalogs Prioritization Module.

In FIG. 1E there is shown, in accordance with some embodiments of the present invention, an exemplary system for generating and providing content recommendations to match the tastes and preferences of a group of users, wherein the Recommendation Engine (10) is functionally associated with a Content Catalogs Prioritization Module (40) for offering content items from specific preferred catalogues such as, but not limited to: catalogues previously used for supplying content item recommendations for the same group initiator or group members, catalogues of third parties offering higher profit margins to recommending entities, catalogues more popular among other recommendation services. As part of generating two or more individual content recommendation sets for each of the members in the user group, the Recommendation Engine (10), in this example, utilizes an Incremental Taste Engine (110) and a Collaborative Filtering Engine (120).

The Recommendation Selection Module (30) in this example, provides to a Content Output Device(s) (50) of the group users—along with the selected content recommendation result set that may comprise the actual recommended content items, and/or identifiers, links, references or the like of/to the recommended content—a per-user content match/confidence rates feedback, for content items in the result set. Members of the pertinent group of users (100, 110, 120) are accordingly presented with data indicative of the direct match rate between content items recommended to their entire group and their own individual profile/characteristics, and the confidence of the system in that assessment.

According to some embodiments of the present invention, there may be provided a computerized recommendation system for generating and providing content recommendations to match the tastes and preferences of a group of users, wherein the system includes: (1) a Profile Engine for generating two or more individual user profiles for each of the members in the user group; (2) a Profile Aggregation Module for adding and combining the individual user profiles into a merged group profile; and (3) a Recommendation Engine for generating a content recommendation set for the user group, at least partially based on the merged group profile.

According to some embodiments, the Profile Aggregation Module, when adding and combining the individual user profiles into a merged group profile, may reference one or more functionally associated Users' Weights Storage databases. User profiles belonging to users having a higher weight (e.g. group initiators) may receive higher effect and thus be more dominant in the Merged Group Profile for which the content recommendation result set is generated, whereas user profiles belonging to users having a lower weight (e.g. parents in parent-kids groups) may receive lower effect and thus be less dominant in the Merged Group Profile for which the content recommendation result set is generated.

Figure 2A:
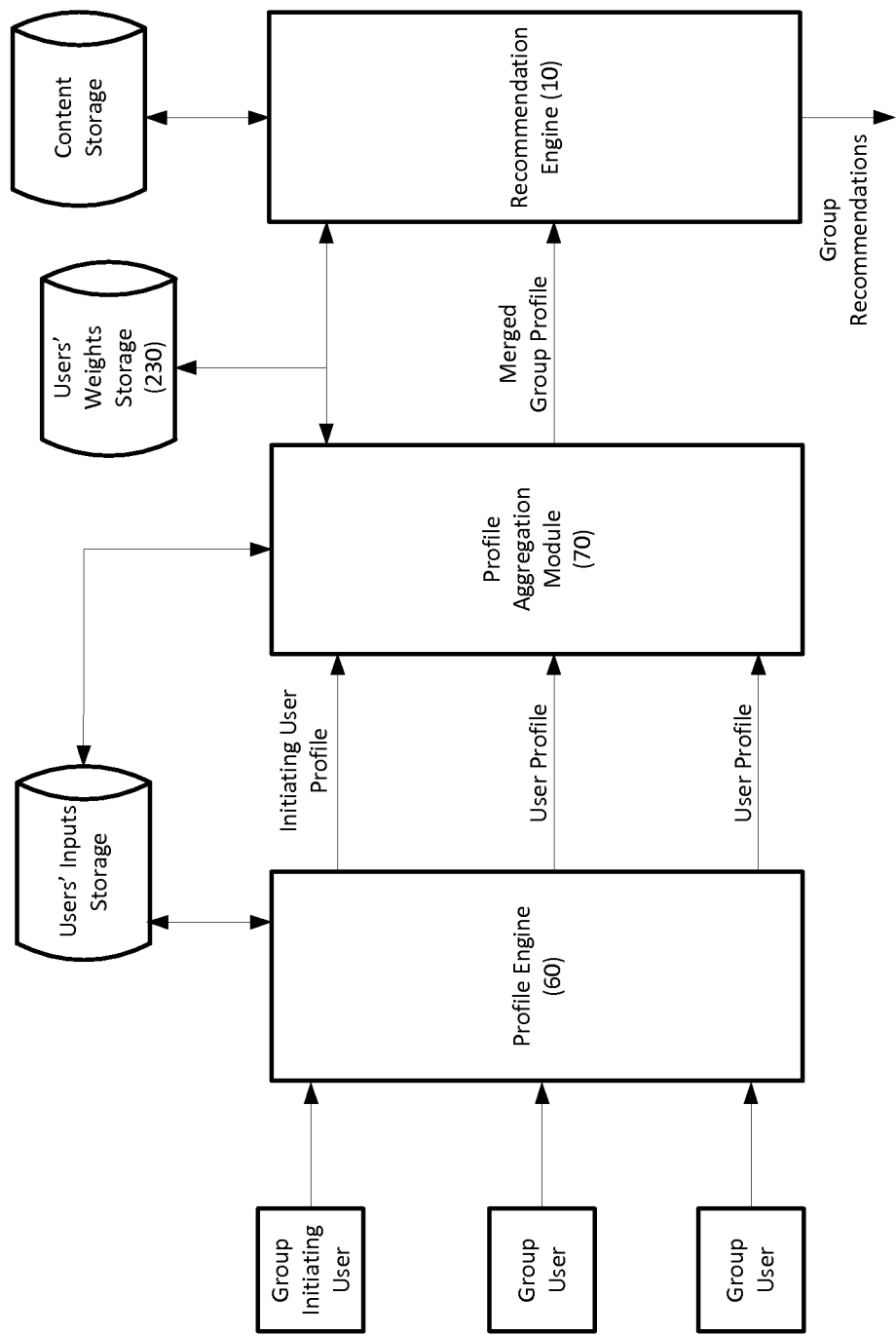
In FIG. 2A there is shown, in accordance with some embodiments of the present invention, an exemplary, merged profile based, system for generating and providing content recommendations to match the tastes and preferences of a group of users.

In FIG. 2A there is shown, in accordance with some embodiments of the present invention, an exemplary system for generating and providing content recommendations to match the tastes and preferences of a group of users, comprising: a Profile Engine (60) for generating two or more individual user profiles for each of the members in the user group; a Profile Aggregation Module (70) for adding and combining the individual user profiles into a merged group profile; and a Recommendation Engine (10) for generating a content recommendation set for the user group, at least partially based on the merged group profile.

The Profile Aggregation Module (70), when adding and combining the individual user profiles into a merged group profile, references a functionally associated Users' Weights Storage (230) database. User profiles belonging to users having a higher weight (e.g. group initiators) may receive higher effect and thus be more dominant in the merged group profile for which the content recommendation result set is generated, whereas user profiles belonging to users having a lower weight (e.g. parents in parent-kids groups) may receive lower effect and thus be less dominant in the merged group profile for which the content recommendation result set is generated.

Figure 2B:
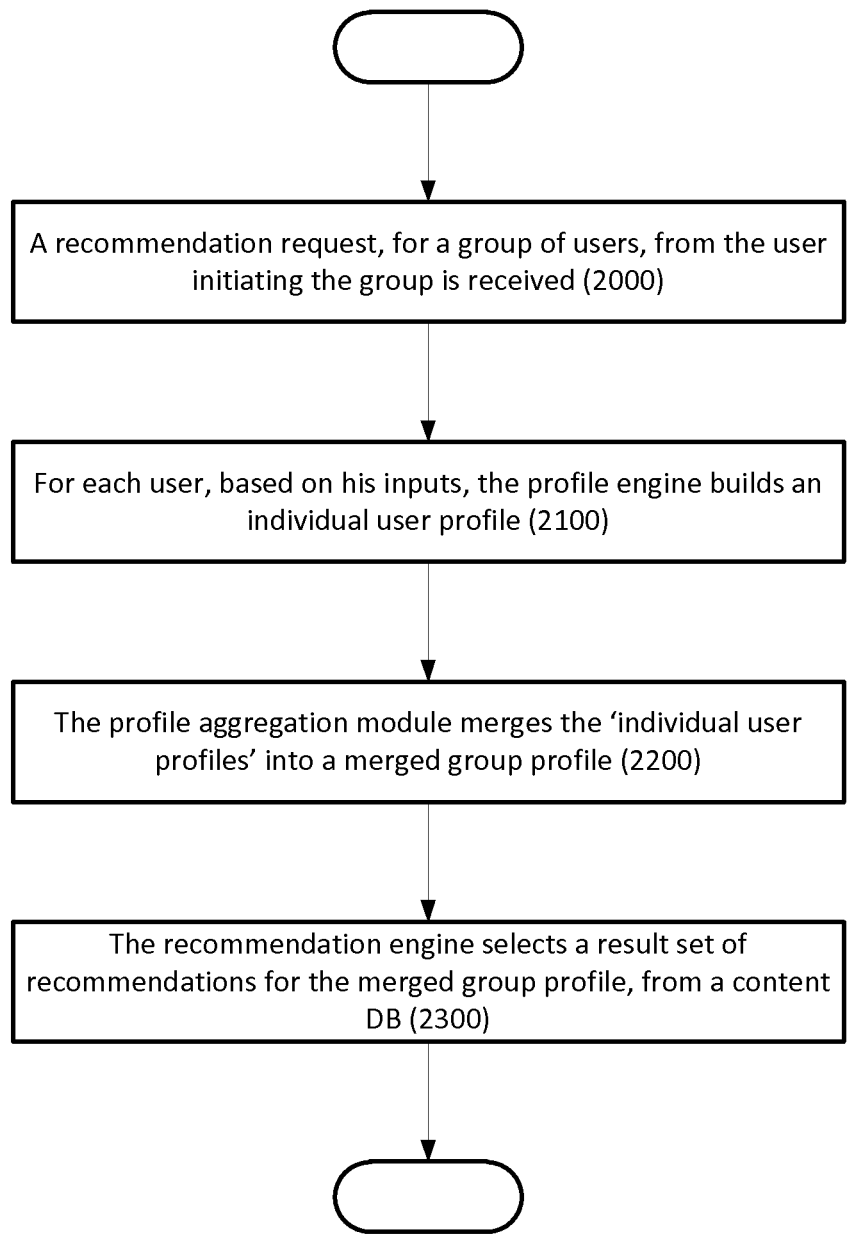
In FIG. 2B there is shown, in accordance with some embodiments of the present invention, a flowchart of the main steps executed by an exemplary, merged profile based, computerized system for generating and providing content recommendations to match the tastes and preferences of a group of users.

In FIG. 2B there is shown, in accordance with some embodiments of the present invention, a flowchart of the main steps executed by an exemplary computerized system for generating and providing content recommendations to match the tastes and preferences of a group of users. The method exemplified comprises the following steps: Receiving a recommendation request, for a group of users, from the user initiating the group (2000); Building an individual user profile for each group user, based on his available (e.g. stored, accessed, received) inputs (2100); Merging the 'individual user profiles' into a merged group profile (2200); and Selecting a result set of recommendations for (i.e. based-upon/intended-for) the merged group profile, as the user group recommendations result (2300).

Figure 2C:
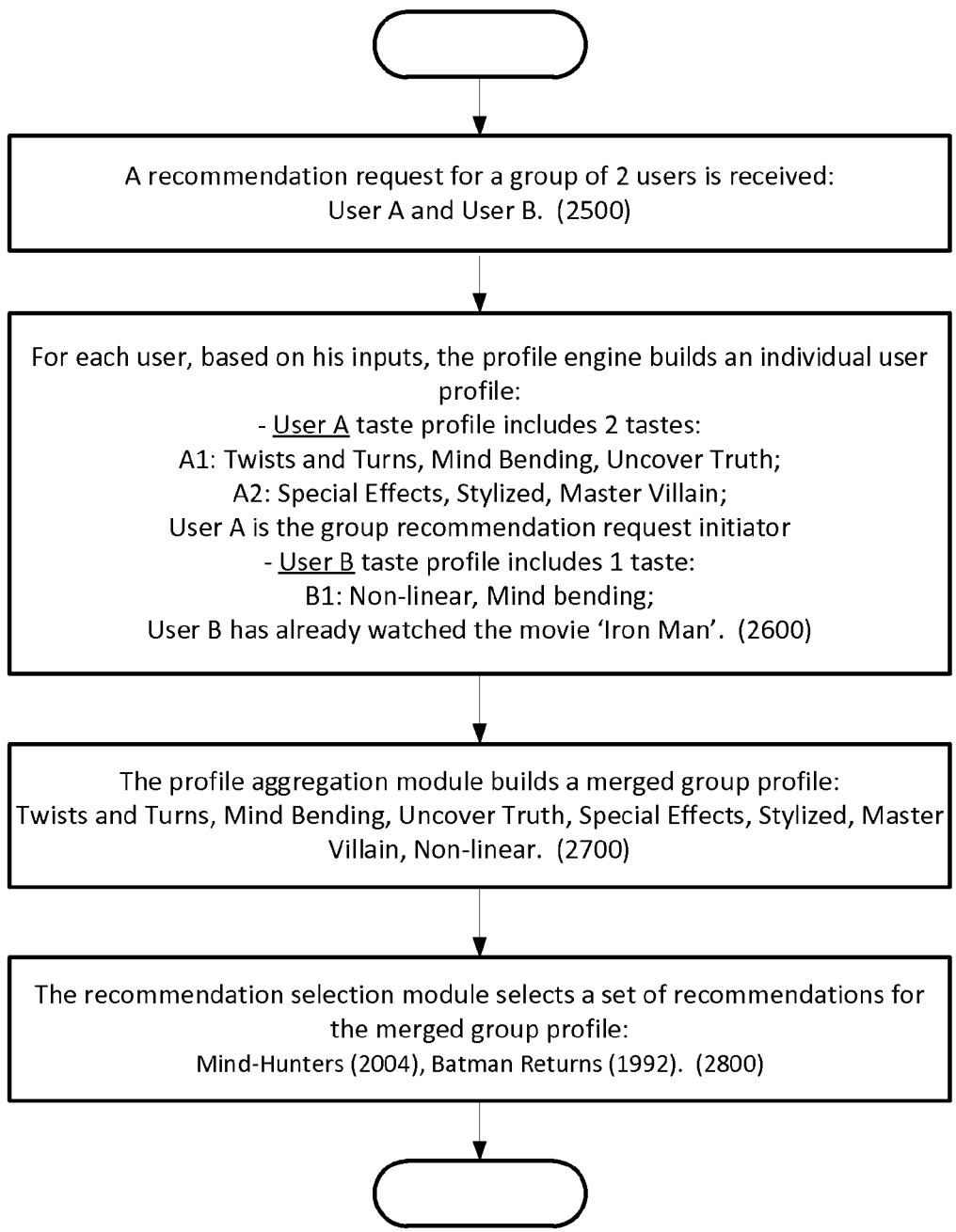
In FIG. 2C there is shown, in accordance with some embodiments of the present invention, a flowchart of the main steps and decisions executed by a simplified exemplary, merged profile based, system for generating and providing content recommendations to match the tastes and preferences of a group of users.

In FIG. 2C there is shown, in accordance with some embodiments of the present invention, a flowchart of the main steps and decisions executed by a simplified exemplary system for generating and providing content recommendations to match the tastes and preferences of a group of users. In this example, a recommendation request for a group of 2 users, User A and User B, is received (2500). For each user, based on his inputs, the Profile Engine builds an individual user profile: User A taste profile includes 2 tastes: A1: Twists and Turns, Mind Bending, Uncover Truth; A2: Special Effects, Stylized, Master Villain; User A is the group recommendation request initiator. User B taste profile includes 1 taste: B1: non-linear, mind bending; User B has already watched the movie 'Iron Man' (2600).

The Profile Aggregation Module then builds a merged group profile including the following tastes: Twists and Turns, Mind Bending, Uncover Truth, Special Effects, Stylized, Master Villain, Non-linear (2700). The Recommendation Selection Module then selects a set of recommendations for (i.e. based-upon/intended-for) the merged group profile including: Mind-Hunters (2004), Batman Returns (1992); as the user group recommendation result set (2800).

According to some embodiments of the present invention, there may be provided a computerized recommendation system for generating and providing content recommendations to match the tastes and preferences of a group of users, wherein the system includes: (1) a Profile Engine for generating a single joint users' taste profile which is generated based on user inputs from two or more members of the user group (i.e. inputs from multiple users are treated as inputs from a single virtual user and the generated profile is designed to match the virtual user's inputs-based taste/preferences); (2) a Recommendation Engine for generating a joint profile content recommendation set for the user group, at least partially based on the joint users' taste profile; and (3) a Recommendation Selection Module for selecting at least a subset of the content items in the joint profile content recommendation set for inclusion in a content recommendation result set and providing it to the pertinent group of users.

According to some embodiments, the Profile Engine, when generating a single joint users' taste profile which is generated based on user inputs from two or more members of the user group, may reference one or more functionally associated Users' Weights Storage databases. User inputs belonging to users having a higher weight (e.g. group initiators) may receive higher effect and thus have more influence on the resulting joint users' taste profile, whereas user inputs belonging to users having a lower weight (e.g. parents in parent-kids groups) may receive lower effect and thus have less influence on the resulting joint users' taste profile.

Figure 3A:
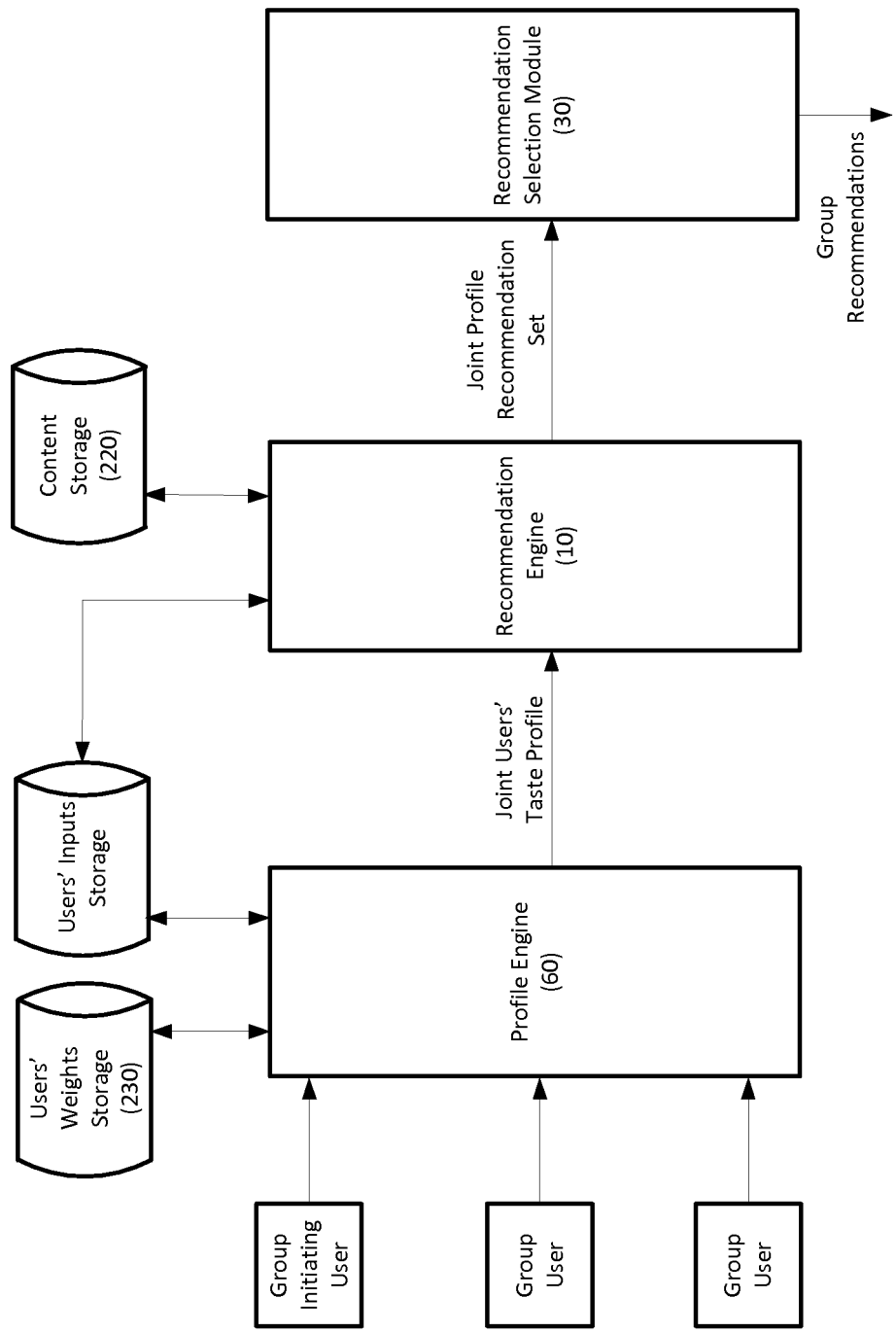
In FIG. 3A there is shown, in accordance with some embodiments of the present invention, an exemplary, joint profile based, system for generating and providing content recommendations to match the tastes and preferences of a group of users.

In FIG. 3A there is shown, in accordance with some embodiments of the present invention, an exemplary system for generating and providing content recommendations to match the tastes and preferences of a group of users, comprising: a Profile Engine (60) for generating a single 'joint users' taste profile' which is generated based on user inputs from two or more members of the user group (i.e. inputs from multiple users are treated as inputs from a single virtual user and the generated profile is designed to match the virtual user's inputs-based taste/preferences); a Recommendation Engine (10) for generating, from content items in a Content Storage (220), a joint profile content recommendation set for the user group, based on the joint users' taste profile; and a Recommendation Selection Module (30) for selecting at least a subset of the content items in the joint profile content recommendation set for inclusion in a content recommendation result set and providing it to the pertinent group of users.

The Profile Engine (60), when generating a single joint users' taste profile which is generated based on user inputs from two or more members of the user group, references a functionally associated Users' Weights Storage (230) database. User inputs belonging to users having a higher weight (e.g. group initiators) may receive higher effect and thus have more influence on the resulting joint users' taste profile, whereas user inputs belonging to users having a lower weight (e.g. parents in parent-kids groups) may receive lower effect and thus have less influence on the resulting joint users' taste profile.

Figure 3B:
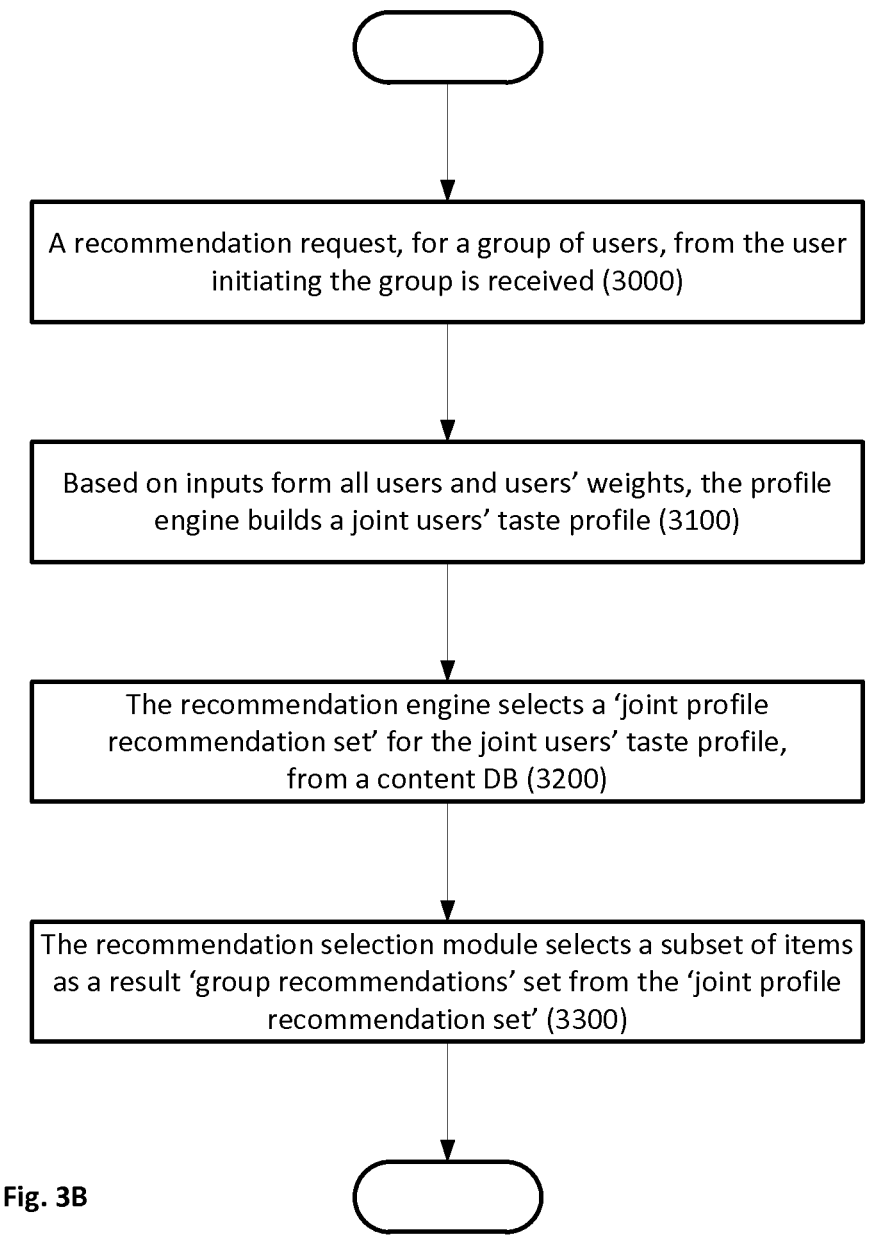
In FIG. 3B there is shown, in accordance with some embodiments of the present invention, a flowchart of the main steps executed by an exemplary, joint profile based, computerized system for generating and providing content recommendations to match the tastes and preferences of a group of users; and In FIG. 3C there is shown, in accordance with some embodiments of the present invention, a flowchart of the main steps and decisions executed by a simplified exemplary, merged profile based, system for generating and providing content recommendations to match the tastes and preferences of a group of users.

In FIG. 3B there is shown, in accordance with some embodiments of the present invention, a flowchart of the main steps executed by an exemplary computerized system for generating and providing content recommendations to match the tastes and preferences of a group of users. The method exemplified comprises the following steps: Receiving a recommendation request, for a group of users, from the user initiating the group (3000); Building a 'joint users' tastes profile' for the entire user group, based on available (e.g. stored, accessed, received) inputs form all group users, while considering users' weights such that inputs of users having higher weights have greater influence on the resulting joint profile (3100); Selecting a 'joint profile recommendation set' for (i.e. based-on/intended-for) the 'joint users' tastes profile' (3200); and Selecting a subset of content items from the 'joint profile recommendation set' as a result recommendation set (3300).

Figure 3C:
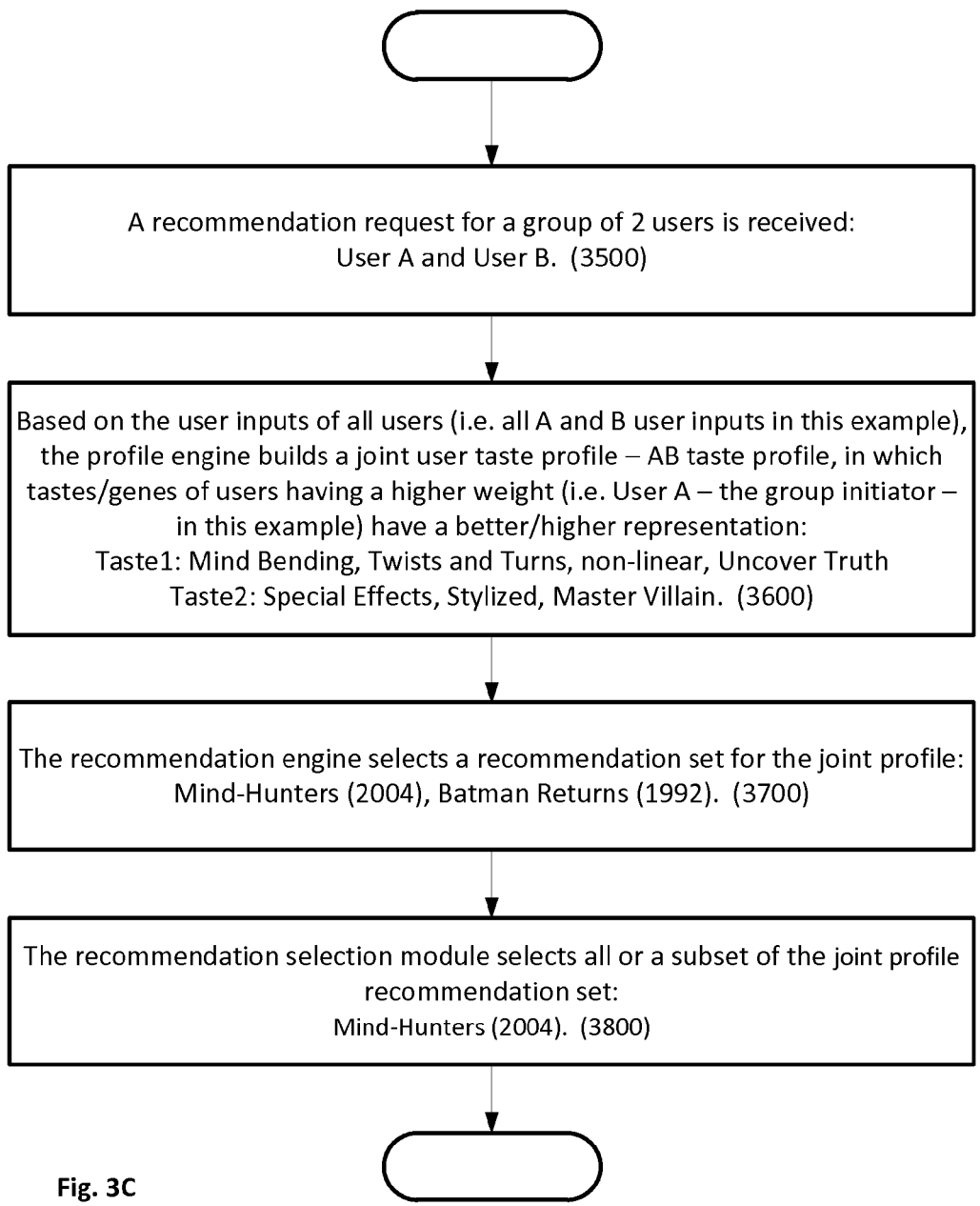

In FIG. 3C there is shown, in accordance with some embodiments of the present invention, a flowchart of the main steps and decisions executed by a simplified exemplary system for generating and providing content recommendations to match the tastes and preferences of a group of users. In this example, a recommendation request for a group of 2 users, User A and User B, is received (3500).

Based on the user inputs of all users in the user group, the Profile Engine builds a: User AB Profile, in which tastes of users having a higher weight (i.e. User A—the group initiator—in this example) have a higher representation. The 'joint users taste profile' in this example includes: Taste1: Mind Bending, Twists and Turns, non-linear, Uncover Truth; Taste2: Special Effects, Stylized, Master Villain (3600).

The Recommendation Engine then selects a recommendation set for the joint profile including: Mind-Hunters (2004), Batman Returns (1992) (3700); and the Recommendation Selection Module selects a subset of the 'joint profile recommendation set' as a result set (3800).

According to some embodiments of the present invention, a system for generating and providing content recommendations to match the tastes and preferences of a group of users may comprise: digital processing circuitry and digital memory including digital processor executable code adapted to provide: a Recommendation Engine for generating two or more individual content recommendation sets for each of the members in the user group; a Recommendation Aggregation Module for adding and combining the individual content recommendation sets into an aggregated recommendation set; and a Recommendation Selection Module for selecting at least a subset of the content items in the aggregated recommendation set for inclusion in a content recommendation result set.

According to some embodiments, the Recommendation Selection Module of the system may further comprise one or more of the following: a Per Item User Counter for recording and counting the number of users to which a given content item was recommended; an Item-User Relevancy Level Calculator for estimating how relevant is a given content item to at least some of the members in the user group; a Previous Items Similarity Calculator for referencing a Previous Recommendations Log database and estimating the similarity level of a given content item to content items selected for the same, and/or a partially overlapping, group(s) in previous rounds of selection; a Direct User Input Analyzer for processing and considering explicit and/or implicit inputs, of members in the user group, relating to a given content item; and a Community Ratings Analyzer for referencing a proprietary and/or third party Community Ratings Storage database and giving a higher preference for inclusion in the content recommendation result set to content items having higher popularity in the community.

According to some embodiments, the Recommendation Selection Module of the system may further be adapted to provide the selected content recommendation result set with a per-user content match and confidence rates feedback for content items in the selected result set. According to some embodiments, the Recommendation Engine of the system may further be adapted to utilize a Content Catalogs Prioritization Module for offering content items from specific preferred catalogues.

According to other embodiments of the present invention, a system for generating and providing content recommendations to match the tastes and preferences of a group of users may comprise: digital processing circuitry and digital memory including digital processor executable code adapted to provide: a Profile Engine for generating user taste profiles; and a Recommendation Engine for generating content recommendations based on the generated profiles.

According to further embodiments, the system may further comprise a Profile Aggregation Module for generating an individual profile for each member in the group of users. The Profile Aggregation Module may add and combine the individual user profiles into a merged group profile, and the Recommendation Engine may generate a content recommendation set for the user group based on the merged group profile.

According to other further embodiments, the system may further comprise a Recommendation Selection Module for generating a single joint users' taste profile based on inputs from multiple members of the group of users. The Recommendation Engine may generate a content recommendation set for the user group based on the joint users' taste profile, and the Recommendation Selection Module may select at least a subset of the content items in the joint profile content recommendation set for inclusion in a content recommendation result set.

According to some embodiments of the present invention, a method for generating and providing content recommendations to match the tastes and preferences of a group of users may comprise: generating two or more individual content recommendation sets for each of the members in the user group; adding and combining the individual content recommendation sets into an aggregated recommendation set; and selecting at least a subset of the content items in the aggregated recommendation set for inclusion in a content recommendation result set.

According to some embodiments, selecting at least a subset of the content items may further comprise one or more of the following: recording and counting the number of users to which a given content item was recommended; estimating how relevant is a given content item to at least some of the members in the user group; referencing a Previous Recommendations Log database and estimating the similarity level of a given content item to content items selected for the same group in previous rounds of selection; processing and considering explicit and/or implicit inputs of members in the user group relating to a given content item; and/or referencing a Community Ratings Storage database and giving a higher preference for inclusion in the content recommendation result set to content items having higher popularity in the community.

According to some embodiments, the method may further comprise: providing the selected content recommendation result set with a per-user content match and confidence rates feedback; and/or offering content items from specific preferred catalogues.

According to some embodiments of the present invention, a method for generating and providing content recommendations to match the tastes and preferences of a group of users may comprise generating user taste profiles; and generating content recommendations based on the generated profiles.

According to some embodiments, the method may further comprise generating an individual profile for each member in the group of users and adding; combining the individual user profiles into a merged group profile; and generating content recommendations based on the merged group profile.

According to some embodiments, the method may further comprise generating a single joint users' taste profile based on inputs from multiple members of the group of users; generating content recommendations based on the joint users' taste profile; and selecting at least a subset of the content items in the joint profile content recommendation set for inclusion in a content recommendation result set.

The subject matter described above is provided by way of illustration only and should not be constructed as limiting. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A system for generating content recommendation sets to match structured preference profiles of a group of users, said system comprising:
 a first computing device including a Recommendation Engine configured to automatically generate for each given user in the group, based on a structured user preference profile of the given user: (i) individual content recommendation sets, and (ii) a score for each content recommendation in the individual recommendation sets, the score representing a confidence of the system in each recommendation in relation to the given user;
 a second computing device including a Recommendation Aggregation Module configured to combine the individual content recommendation sets into an aggregated recommendation set;
 a third computing device including a relevancy level calculator configured to calculate a relevancy level of items in the aggregated recommendation set in relation to each user in the group, by calculating within a vector space defined by a defined taxonomy of media specific content genes, for each given item in the aggregated recommendation set, in relation to each given user in the group, a distance between: (a) a vector representing a set of salience values of first semantic characteristics within the given content item, which first semantic characteristics are selected from the defined taxonomy of media specific content genes, and (b) as centroid of a vector cluster, each vector in the cluster representing a set of values of second semantic characteristics of rated content items related to the given user, which second semantic characteristics are also selected from the defined taxonomy of media specific content genes; and
 a fourth computing device including a Recommendation Selection Module configured to automatically select a subset of selected content recommendations, from the aggregated recommendation set, for inclusion in a content recommendation result set for the group, based at least partially on:
  a. a number of the individual content recommendation sets including the selected content recommendations;
  b. the scores of the selected content recommendations in the individual content recommendation sets; and
  c. the calculated relevancy levels of the selected content recommendations.

2. The system according to claim 1, further comprising a Per Item User Counter for recording a number of users to which a given content item was recommended.

3. The system according to claim 1, wherein said Recommendation Selection Module is further configured to factor a calculated similarity level above a defined threshold between one or more of the selected content recommendations and a content item associated with a recommendation history of one or more of the users, when selecting a subset of selected content recommendations.

4. The system according to claim 1, further comprising a Direct User Input Analyzer comprising processing circuitry configured to process user inputs, of users in the group, relating to content items and modify the user preference profiles accordingly.

5. The system according to claim 1, wherein said Recommendation Selection Module is further configured to factor a community rating of one or more of the selected content recommendations when selecting a subset of selected content recommendations.

6. The system according to claim 1, wherein said system is further adapted to calculate and provide per-user match rates between the selected content recommendations and each given user in the group.

7. The system according to claim 1, wherein said Recommendation Engine is functionally associated with a Content Prioritization Module for offering content items from specific preferred catalogues.

8. A method for generating content recommendation sets to match structured preference profiles of a group of users, said method comprising:
 using a computing device to automatically generate for each given user in the group, based on a structured user preference profile of the given user: (i) individual content recommendation sets, and (ii) a score for each content recommendation in the individual recommendation sets, the score representing a confidence of the system in each recommendation in relation to the given user;
 using a computing device to combine the individual content recommendation sets into an aggregated recommendation set;
 using a computing device to calculate a relevancy level of items in the aggregated recommendation set in relation to each given user in the group by calculating, within a vector space defined by a defined taxonomy of media specific content genes, a distance between: (a) a vector representing a set of salience values of first semantic characteristics within the given content item, which first semantic characteristics are selected from the defined taxonomy of media specific content genes, and (b) a centroid of a vector cluster, each vector in the cluster representing a set of values of second semantic characteristics of rated content items related to the given user, which second semantic characteristics are also selected from the defined taxonomy of media specific content genes; and
 using a computing device to automatically select a subset of selected content recommendations, from the aggregated recommendation set, for inclusion in a content recommendation result set for the group, based at least partially on:
  a. a number of the individual content recommendation sets including the selected content recommendations;
  b. the scores of the selected content recommendations in the individual content recommendation sets; and
  c. the calculated relevancy levels of the selected content recommendations.

9. The method according to claim 8, wherein using a computing device to automatically select a subset of the content items further comprises recording a number of users to which a given content item was recommended.

10. The method according to claim 8, wherein using a computing device to automatically select a subset of the content items further comprises calculating and factoring a similarity level above a defined threshold between one or more of the selected content recommendations and a content item associated with a recommendation history of one or more of the users.

11. The method according to claim 8, wherein using a computing device to automatically select a subset of the content items further comprises processing user inputs, of users in the group, relating to content items and modifying the user preference profiles accordingly.

12. The method according to claim 8 wherein using a computing device to automatically select a subset of the content items further comprises factoring a Community Rating of one or more of the selected content recommendations.

13. The method according to claim 8, further comprising providing per-user match rates between the selected content recommendations and each given user in the group.

14. The method according to claim 8, wherein using a computing device to automatically select a subset of the content items includes preferring content items from specific preferred catalogues.

15. A system for generating content recommendation sets to match structured preference profiles of a group of users; said system comprising:
  a first computing device including a Recommendation Engine configured to automatically generate for each given user in the group, based on a structured user preference profile of the given user: (i) individual content recommendation sets for the given user, and (ii) a score for each content recommendation in the individual recommendation sets, the score representing a confidence of the system in each recommendation;
  a second computing device including a Recommendation Aggregation Module configured to combine the individual content recommendation sets into an aggregated recommendation set; and
  a third computing device including a Recommendation Selection Module configured to automatically select a subset of selected content recommendations; from the aggregated recommendation set, for inclusion in a content recommendation result set for the group, based at least partially on:
    a. a number of the individual content recommendation sets including the selected content recommendations;
    b. the scores of the selected content recommendations in the individual content recommendation sets; and
    c. a community rating of one or more of the selected content recommendations a fourth computing device including a Relevancy Level Calculator configured to calculate a relevancy level of a given item in the aggregated recommendation set, in relation to a given user in the group, by calculating, within a vector space defined by a defined taxonomy of media specific content genes, a distance between: (a) a vector representing a set of salience values of first semantic characteristics within the given content item, which first semantic characteristics are selected from the defined taxonomy of media specific content genes, and (b) a centroid of a vector cluster, each vector in the cluster representing a set of values of second semantic characteristics of rated content items related to the given user, which second semantic characteristics are also selected from the defined taxonomy of media specific content genes; and wherein said Recommendation Selection Module is configured to factor the calculated relevancy levels when automatically selecting a subset of selected content recommendations.

16. The system according to claim 15, wherein said Recommendation Selection Module is further configured to factor a calculated similarity level above a defined threshold between one or more of the selected content recommendations and a content item associated with a recommendation history of one or more of the users, when selecting a subset of selected content recommendations.

17. The system according to claim 15, wherein said system is further adapted to calculate and provide per-user match rates between the selected content recommendations and each given user in the group.

18. A system for generating content recommendation sets to match structured preference profiles of a group of users; said system comprising:
  a first computing device including a Recommendation Engine configured to automatically generate for each given user in the group, based on a structured user preference profile of the given user: (i) individual content recommendation sets for the given user, and (ii) a score for each content recommendation in the individual recommendation sets, the score representing a confidence of the system in each recommendation;
  a second computing device including a Recommendation Aggregation Module configured to combine the individual content recommendation sets into an aggregated recommendation set; and
  a third computing device including a Recommendation Selection Module configured to automatically select a subset of selected content recommendations, from the aggregated recommendation set, for inclusion in a content recommendation result set for the group, based at least partially on:
    a. a number of the individual content recommendation sets including the selected content recommendations;
    b. the scores of the selected content recommendations in the individual content recommendation sets; and
    c. a calculated similarity level above a defined threshold between one or more of the selected content recommendations and a content item associated with a recommendation history of one or more of the users
  a fourth computing device including a Relevancy Level Calculator configured to calculate a relevancy level of a given item in the aggregated recommendation set, in relation to a given user in the group, by calculating, within a vector space defined by a defined taxonomy of media specific content genes, a distance between: (a) a vector representing a set of salience values of first semantic characteristics within the given content item, which first semantic characteristics are selected from the defined taxonomy of media specific content genes, and (b) as centroid of a vector cluster, each vector in the cluster representing a set of values of second semantic characteristics of rated content items related to the given user, which second semantic characteristics are also selected from the defined taxonomy of media specific content genes; and wherein said Recommendation Selection Module is configured to factor the calculated relevancy levels when automatically selecting a subset of selected content recommendations.

* * * * *